March 10, 1942.　　　D. SAMIRAN　　　2,275,472
PRESSURE REGULATOR FOR FUEL SYSTEMS
Filed July 31, 1940　　　2 Sheets-Sheet 1
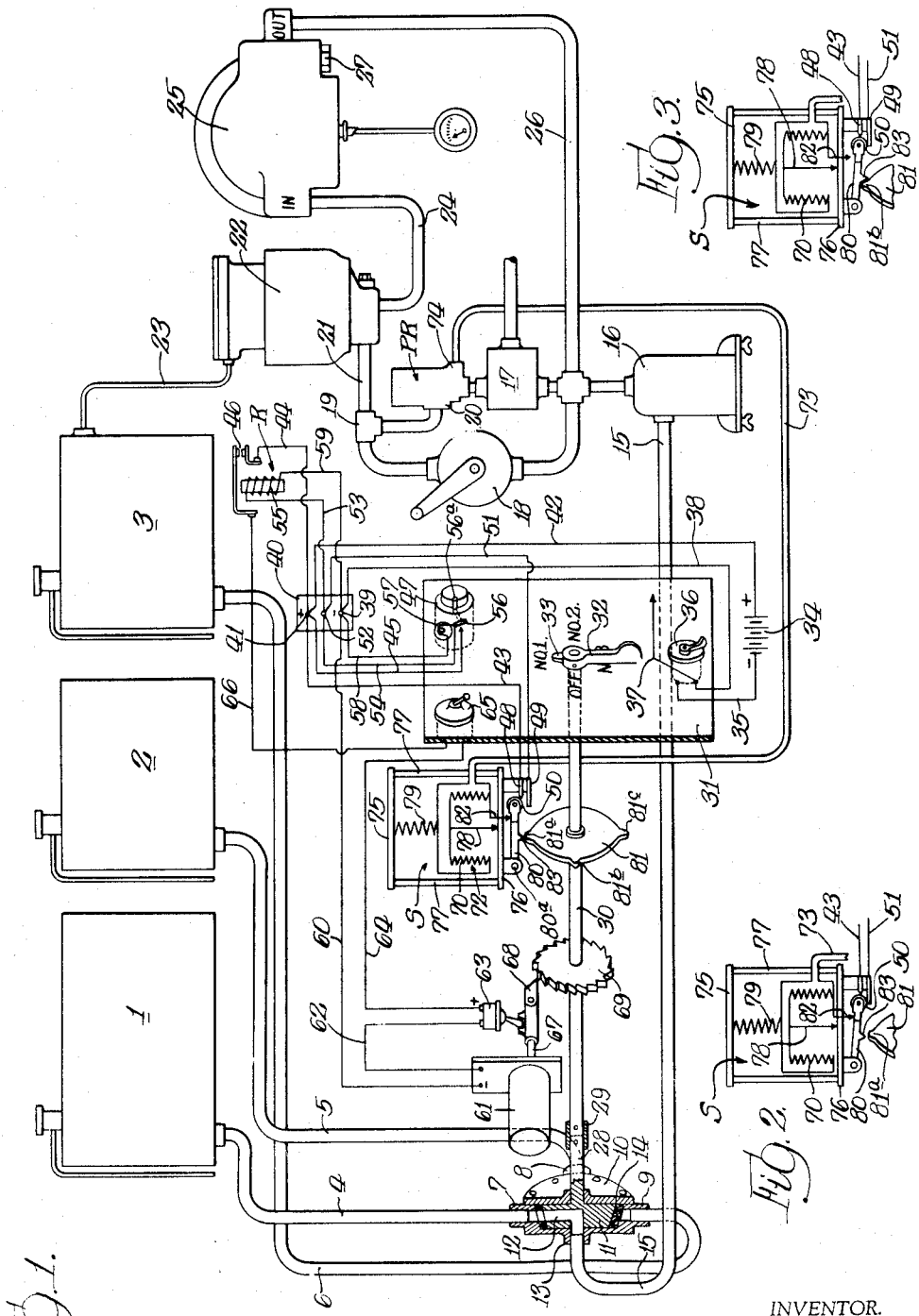
INVENTOR.
David Samiran
BY
ATTORNEYS.

March 10, 1942.  D. SAMIRAN  2,275,472
PRESSURE REGULATOR FOR FUEL SYSTEMS
Filed July 31, 1940   2 Sheets-Sheet 2
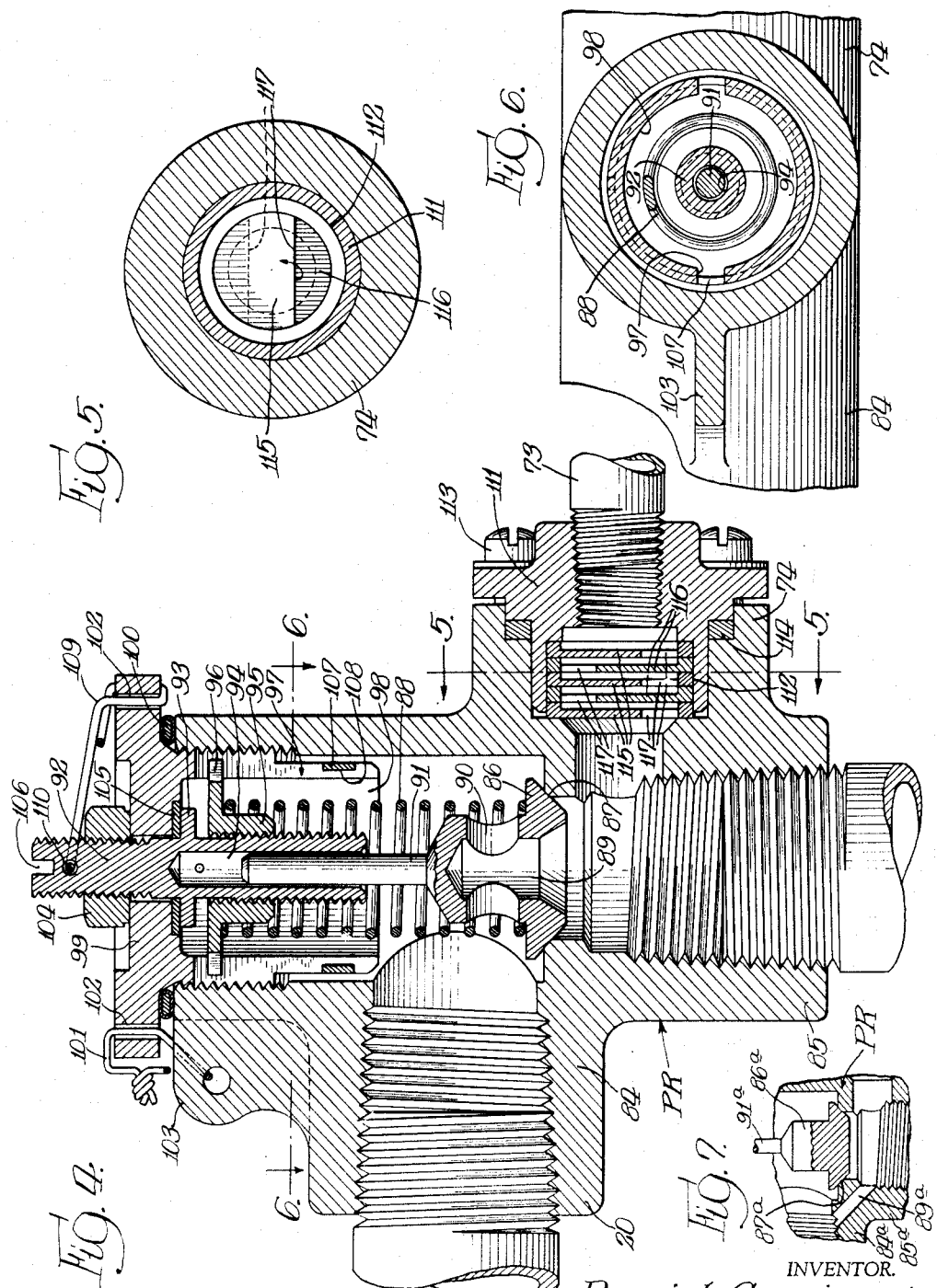
INVENTOR.
David Samiran
BY
ATTORNEYS.

Patented Mar. 10, 1942

2,275,472

UNITED STATES PATENT OFFICE 2,275,472

PRESSURE REGULATOR FOR FUEL SYSTEMS

David Samiran, Fairfield, Ohio

Application July 31, 1940, Serial No. 348,970

14 Claims. (Cl. 158—36)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates broadly to fuel systems provided with a plurality of separate fuel sources and in a more limited sense to a fuel system in which the contents of fuel containers representative of fuel sources are automatically connected in a predetermined order to a source of fuel consumption, such as an aircraft engine, the present application being a continuation in part of my copending application Serial No. 261,542, filed March 13, 1939.

One of the main objects of the present invention is to provide a pressure regulator device which may be inserted in the fuel line of such a system and which regulates the pressure in a conduit leading to a pressure responsive switch operable to automatically control a selector valve interposed between the fuel delivery portion of my fuel system and the plurality of separate fuel sources to effect automatic connection of the source of fuel consumption with successive fuel sources as they become exhausted.

Still another object is to provide a regulator which has connections for interposition between a fuel pump and a fuel consuming or discharging device, such as an injector or carburetor of an aircraft engine, a switch pressure connection being provided and leading to a bellows chamber of a pressure responsive switch structure so that upon the presence of predetermined fuel pressure in the connection the switch will remain in one position, while a drop in the pressure to a value below the predetermined value will effect changing of the position of the switch to control the mechanism that advances the selector valve to its next position, such changes in the pressure resulting from the emptying of successive fuel tanks.

Still another object is to provide a pressure regulator device wherein a valve plug with a passage through it permits a predetermined quantity of fuel to pass through the valve plug and the fuel maintains a predetermined pressure in the conduit leading to the pressure responsive switch as long as the pump supplies a normal amount of liquid to the regulator at a normal pressure, any increase in liquid or pressure effecting unseating of the valve to permit passage of the additional fuel through the valve without substantially raising the pressure in the pressure responsive switch.

Still a further object is to provide in the pressure regulator device a system of baffle plates effective to prevent any appreciable amount of air getting into the conduit leading to the pressure responsive switch, but which permits expansion of the liquid fuel in the conduit due to heat and permits passage of additional fuel into the conduit when the liquid therein contracts, such as due to cold and high altitudes, a uniform pressure thereby being provided by the pressure regulator device in the bellows chamber of the pressure switch.

With these and other objects in view, my invention with respect to its features which I believe to be novel and patentable will be pointed out in the claims appended hereto. For a better detailed understanding of the invention, and further objects relating to details of economy of my invention, reference is made to the following description and to the accompanying drawings wherein such further objects will definitely appear, and in which Figure 1 is a diagrammatic representation of a fuel system in which my pressure regulator is installed;

Figure 2 is a diagrammatic view of a pressure responsive switch of the system showing the parts in a different position from that of Figure 1;

Figure 3 is a similar view showing still a different position;

Figure 4 is an enlarged vertical sectional view through the pressure regulator per se;

Figures 5 and 6 are sectional views thereof on the lines 5—5 and 6—6 respectively of Figure 4, and Figure 7 is a modification of my pressure regulator.

In a fuel system of the general character disclosed, I seek to accomplish two objectives: First, I am concerned with providing means whereby a source of fuel consumption such as an internal combustion engine injector or carburetor may be readily interconnected with any one of a plurality of fuel containers through simple manual turning of a selector valve. Secondly, I seek to provide means for automatically turning the aforesaid selector valve from a container from which all fuel has just been exhausted to the next fuel container in selector valve order, from which fuel has not yet been exhausted.

Merely for the purposes of illustration, I provide three fuel containers, 1, 2 and 3. Obviously, a greater or less number of containers may be provided without in any way departing from the spirit of my invention. Conduits 4, 5 and 6 lead from the containers 1, 2 and 3 to inlets 7, 8 and 9 of a selector valve 10. Within the selector valve 10, a tapered valve plug 11 is provided with an L-shaped passageway 12. The L-shaped passageway 12 is adapted to communicate any one of the inlets 7, 8 or 9 with an outlet 13. The periphery of the tapered valve plug 11 may be cork faced as at 14.

From the outlet 13 of the selector valve 10, a conduit 15 leads to a fuel strainer 16. The outlet of the fuel strainer 16 is connected with the inlets of an engine-driven fuel pump 17 and a manually operated wobble pump 18. The outlet of the pump 17 is connected with my pressure regulator, indicated generally at PR, while the outlet of the pump 18 is connected with a T fitting 19. The pressure regulator PR also has an outlet 20 connected with the T fitting 19 and from the T fitting a conduit 21 extends to an air-vapor eliminator 22 which is described in my copending application hereinbefore referred to.

The air-vapor eliminator 22 has an air-vapor outlet connected by a copper tube or the like 23 to one of the fuel tanks such as 3 above the level of fuel therein. The air-vapor eliminator also has a fuel outlet which is connected by a conduit 24 to a fuel injector 25. A pressure regulated outlet of the injector 25 is connected by a conduit 26 to the intakes of the pumps 17 and 18. The injector 25 includes as part of its construction a by-pass type of pressure regulator 27 set at a predetermined pressure, so that any fuel in excess of the requirements of the injector and above such predetermined pressure returns from the outlet of the injector to the intake of the pump 17 during operation of the engine.

Fuel injectors such as the general type shown diagrammatically at 25 are used extensively in connection with aircraft engines, whereas some engines are equipped with a carburetor which may equally well be substituted for the fuel injector.

For operating the selector valve 10 manually, the selector valve plug 11 has a stem 28 which is connected by a coupling sleeve 29 and suitable pins to an extension shaft 30. The shaft 30 extends through a control panel 31 and has thereon a manual control lever 32. The control lever 32 has a pointer 33 which is adapted to cooperate with indicia on the panel, such as "No. 1, No. 2, No. 3" and "off," to indicate to the operator which fuel container the selector valve is connected with, and to indicate when it is turned off.

The fuel system illustrated also includes a switch indicated generally at S, which cooperates with other parts of the system to effect automatic advance of the selector valve. The switch S is more completely disclosed in my co-pending application Serial No. 353,539, filed August 21, 1940, and operates within certain pressure limits. To obtain satisfactory pressure for the switch S, is the purpose of my pressure regulator PR, which will hereinafter be described in detail.

In conjunction with the switch S, a source of electric current, such as a battery 34, is provided. The negative side of the battery 34 is connected by a wire 35 to an ignition switch 36 on the control panel 31. The ignition switch is connected by a wire 37 to the ignition mechanism of the engine (not shown). Another wire 38 from the ignition switch 36 extends to a negative terminal 39 on a terminal panel 40.

The terminal panel 40 has a positive terminal 41 connected by a wire 42 to the positive side of the battery 34.

By means of wires 43, 44 and 45, the positive terminal 41 is connected to the switch S, contacts 46 of a relay R and an indicator light 47, respectively. The wire 43 is connected to a contact plate 48 of the switch S, which is adapted at times to be connected to a contact plate 49 by a roller bridging the contact plates, as shown in Figures 2 and 3. The contact plate 49 is connected by a wire 51 to a control terminal 52 of the terminal panel 40. Wires 53 and 54 respectively connect the control terminal 52 with a coil 55 of the relay R and with a test switch 56 of the indicator light 47. The wire 45 is also connected to one side of a signal bulb 57 in the indicator light 47, the other side of which is connected by a wire 58 to the negative terminal 39 of the panel 40. The other side of the relay coil 55 is connected by a wire 59 to the negative terminal 39.

The negative terminal 39 is also connected by a wire 60 to a solenoid 61, the other side of which is connected through a wire 62, a toggle switch 63, a wire 64, a solenoid cutout switch 65 and a wire 66 to the contacts 46 of the relay R.

The solenoid 61 and the toggle switch 63 are provided to electro-mechanically rotate the extension shaft 30. For this purpose a plunger 67 of the solenoid 61 is propelled in a right hand direction when the solenoid is energized, thereby causing a pawl 68 to engage a tooth of a ratchet wheel 69 on the shaft 30 and advance it the distance of one tooth. This effects movement of the toggle switch 63 to "off" position, so that the plunger 67, being spring returned, will pull the pawl 68 to a position back of the next tooth of the ratchet wheel 69 and also turn the toggle switch 63 "on." This will cause another energization of the solenoid 61 to advance the ratchet wheel another tooth, and the advancing cycles will be repeated until the circuit is broken to the solenoid and toggle switch by opening of the contacts 46 of the relay caused by de-energization of its coil 55. Such de-energization is effected by opening of the circuit across the elements 48, 50, 49 of the switch S, as will hereinafter appear.

The switch S comprises in general a bellows 70 in a bellows chamber 72. The pressure in the bellows chamber 72 is increased and decreased by pressure in a conduit 73 that extends to a switch pressure outlet 74 of the pressure regulator PR.

A switch carriage consisting of carriage bars 75 and 76 connected together by slidably mounted tie rods 77 is adapted to be actuated by the bellows 70 through the medium of a stem 78. A spring 79 tends to lift the switch carriage and keep it in engagement with the stem 78. The roller 50 is carried by a switch arm 80 pivoted to ears 80a of the carriage bar 76. The switch arm 80 is of spring extended telescopic construction, as shown in my copending applications hereinbefore referred to, and the left end of the contact plate 48 is V or knife-edge shaped to coact with the roller 50 and retain the switch in either open or closed position (as shown in Figures 1 and 2, respectively), when once it has been shifted to either position by collapse or expansion of the bellows 70 and until such time as a cam lobe of a control disc 81 or a stationary stud 82 cooperating with the bellows 70 changes the position of the switch.

The switch arm 80 is adapted to be engaged, at times by the stationary stud 82, as shown in Figure 2. The switch arm has a cam lobe 83 with which cam lobes 81a, 81b and 81c of the control disc 81 are adapted to coact successively.

Referring now to the pressure regulator per se (particularly Figures 4, 5 and 6), it is composed of a valve body 84 having an inlet boss 85, the outlet boss 20 and the boss 74 for connection to the conduit 73 leading to the switch S. A valve plug 86 is normally seated against a seat 87 of the valve body 84 by a spring 88. The valve plug 86 normally seals the passageway through the valve body 84 between the inlet 85 and the outlet 20, except for what liquid and/or air may by-pass through a vertical bore 89 and transverse bores 90 of the valve plug 86. In the modification of Figure 7, such liquid and/or air bypasses the valve plug 86 through a passageway 89a.

The valve plug 86 has a stem 91 extending slidably into a centrally flanged adjusting stem 92. The flange is indicated at 93. The adjusting stem 92 has a bore 94 to receive the valve stem 91. The lower end of the adjusting stem is exteriorly threaded and an adjusting nut 95 is mounted thereon. The adjusting nut 95 has a pair of opposite fingers 96 slidable in slots 97 of a cylindrical portion 98 of a head member 99. The head member 99 is screwed into the top of the valve body 84 with a gasket 100 interposed between the head and the valve body. A lock wire 101 extends through a perforation 102 of the head 99 and through a perforated ear 103 of the valve body 84 to prevent loosening of the head with respect to the valve body after assembly.

The upper end of the adjusting stem 92 is threaded for a lock nut 104. When the lock nut 104 is tight, a gasket 105 prevents leakage from within the valve body 84 past the adjusting stem 92 to the top of the head 99. Whenever it is desirable to change the adjustment of the spring 88, the lock nut 104 may be loosened and the screw 92 rotated by engaging a screwdriver in a slot 106 at the top end thereof, for the purpose of rotating the adjusting stem. Such rotation results in the adjusting nut 95 (held against rotation by the fingers 96 in the slots 97) being moved upwardly or downwardly within the valve body 84 and thereby decreasing or increasing the tension of the spring 88. To prevent excessive downward adjusting movement of the nut 95, a stop band 107 surrounds the cylindrical portion 98 and is seated in a groove 108 thereof.

After the adjusting stem 92 has been adjusted as desired, a lock wire 109 is passed through a perforation 110 thereof and through another of the perforations 102 in the head 99 to prevent loosening of the parts. The head 99 together with the parts 92 and 95 provide a readily removable self-contained subassembly.

The boss 74 has located therein a flanged coupling sleeve 111 threaded to receive the conduit 73 and provided with a bore 112. The sleeve 111 may be secured in position as by cap screws 113 with a gasket 114 interposed between the sleeve and the boss 74 to prevent leakage.

The bore 112 is provided with a series of closely spaced baffle plates 115 and 116. The plates 115 and 116 have cutout portions 117 which are staggered, the cutout portions of the discs 115 being adjacent the bottom of the bore 112 and the cutout portions of the discs 116 being adjacent the top thereof. Accordingly, a tortuous path for fluid flow is provided from the interior of the valve body 84 to the pipe 73 or in the opposite direction.

The operation of the system disclosed, and particularly the pressure regulator PR, will now be described. During operation of the engine, the pump 17 is operating and thereby fuel is entering the inlet 85 of the pressure regulator and flowing from the outlet 20. Due to the construction of the pressure regulator, the fuel is introducing one or the other of two ranges of pressure in the bellows chamber 72 of the switch S.

If the rate of fuel flow through the bores 89 and 90 of the valve plug 86 or through the passageway 89a of Figure 7 is low (whatever can flow freely through them), a low pressure reaction insufficient to materially compress the bellows 70 results. On the other hand, if the rate of fuel flow through the pressure regulator is high (fuel in excess of what can flow freely through the bores or passageway), a high pressure reaction sufficient to contract the bellows 70 against the action of the spring 79 results. Under full engine revolution the last named result is rapidly effected after fuel entry into the pump 17 from a full fuel tank, after a previous one has been emptied.

The fuel flowing through the valve plug 86 to the air-vapor eliminator 22 and the injector 25 is controlled by the valve plug 86. Any time that fuel pressure builds up in excess of the desired pressure as set by the spring 88, the valve plug 86 is lifted by the flowing fuel from the seat 87, thus increasing the flow of fuel from the outlet 20 of the pressure regulator PR. The pressure regulator is thus operable to permit either a subnormal or normal amount of fuel to pass through it by the valve plug 86 remaining seated for subnormal amounts and being unseated for normal amounts. The pressure to the bellows chamber 72 of the switch S, however, will remain substantially constant, as set by the spring 88, as long as the fuel flow through the valve is normal. Any substantial drop below this pressure, as caused by the supply of fuel being exhausted from the tank being used, and subsequent starving of the pump and escape of the air flow through the orifice 89 or 89a, will permit the spring 79 of the switch S to collapse the bellows 70 and thereby close the switch 48—50—49, as in Figure 2.

At this point it is desired to emphasize the fact that unless the pressure in the pressure chamber 72 of the pressure switch S is built up to the switch-operating value within a given interval of time corresponding to the time required to move the selector valve from any one position of registration with a tank outlet to another, the system shown in Figure 1 will not operate successfully.

Let us assume that no time control device such as my pressure regulator PR is provided in the system. Then the interval of time required to build up the pressure in the pressure switch S would be dependent upon the time interval of building up the pressure in the fuel line leading from the pump to the carburetor including the pressure switch, and it would vary with the variation in the quantity of fuel in the line, which in turn would be determined by the rate of consumption of the fuel. Obviously, if all of the tanks are full, then it may be presumed that the time interval for building up the pressure in the fuel line would be substantially alike for all tanks and the system would operate successfully.

If, however, one of the tanks—as tank 2 for example—were empty, then the total elapsed time for building up the pressure in the fuel line will be greater than the time interval allowed for moving the selector valve from one position to another. Consequently, the selector valve will arrive in a position of registration prior to the time when the pressure switch will be built up to that value necessary for switching of the lever 80 to the position of Figure 1 to thereby stop the valve's rotation, with the result that the valve will continue to rotate out of registration, thus causing a further depletion by engine consumption of the fuel in the fuel line, requiring a still longer time to build up the pressure in the fuel line. Under these assumed conditions, the selector will not remain in a position of registration with a full tank for a period long enough to build up the pressure in the pressure switch; and therefore the fuel line, including the reservoir, will be pumped dry, even though certain of the fuel tanks may be filled with fuel.

The provision of my pressure regulator PR and the positioning of the same between the pump 17 and the vapor eliminator 22 enables the building up of the pressure in the pressure chamber 72 of the pressure switch S in an interval of time that will be the same for each of the positions of communication between the selector valve and tanks, regardless of the amount of fuel contained in the line leading from the pump to the carburetor.

The pump and the pressure regulator are preferably closely coupled to reduce the fuel containing capacity therebetween whereby the time interval for building up the pressure in the pressure switch is reduced to a minimum value which will correspond substantially to the time consumed in moving the selector valve from the initial position of registration of the valve passage 12 with the passages 4, 5, 6, respectively, and the full registration position thereof. It will thus be seen that the carriage 75—76—77 will move to its outermost position slightly prior to the arrival of the selector valve to its full operative positions placing the lobe 83 of the switch arm 80 in the path of the lobes 81a, 81b, 81c, to be engaged by one of them for moving the switch arm 80 relative to its carriage and thereby breaking the circuit which determines the operation of the selector valve through the deenergization of the solenoid 61.

My pressure regulator is provided with an orifice 89 or 89a communicatively connecting the conduits on opposite sides of the pressure regulator valve 86. The purpose of this orifice is to enable the air flow caused by the operation of the pump during the transition period of shifting the selector valve from a position of communication with an empty tank to a position of communication with a filled tank, to bypass the loaded valve 86, for otherwise this air flow would build up a pressure in the line controlled by the loaded valve, of sufficient magnitude to move the pressure switch arm 80 to open circuit position with the result that the selector valve will be stopped prior to the time when registration thereof with one of the tank outlets is accomplished. The orifice 89 or 89a is preferably of such size that the resistance to liquid flow under normal operation is such as to rapidly build up the pressure in that portion of the fuel line controlled by the pressure regulator loaded valve 86. In this way a very small interval of time is permitted to elapse for building up the pressure in the pressure switch, after initial registration of the selector valve with the outlet of a fuel filled tank. Thus, it will be seen that the orifice 89 or 89a constitutes a substantial resistance to liquid flow and a negligible resistance to air flow to quickly build up pressure under fuel flow condition of operation and practically no pressure under air flow condition of operation.

Since it is undesirable for the bellows chamber 72 to be subjected to sudden changes in pressure, and since it is undesirable to permit draining of the pipe 73 whenever the fuel pressure produced by the pump decreases substantially, as a result of a full container becoming empty and yet permitting any expansion or contraction of the fluid in the conduit 73 as caused by different altitudes and temperatures, I provide the baffle plate arrangement 115—117. The tortuous path for the fuel provided by the staggered arrangement of the baffle plate openings damps out any sudden surges or pressure changes, yet permits fuel flow in a restricted and slow manner.

Having described the particular purpose of my pressure regulator, especially in connection with the switch S, I will now describe briefly the operation of the entire system.

The ignition switch 36 is turned "on" when the operator wishes to start the engine. The various instrumentalities of the automatic selector valve system are always out of circuit whenever the ignition switch is "off," to guard against possible unnecessary operation and waste of current when the engine is not operating. In Figure 1, the parts are in a position assumed while fuel is being delivered to the injector 25 by the pump 17. When the fuel tank 1 becomes empty, the pump 17 will be starved and the pressure will reduce within the valve body 84 and likewise within the conduit 73, and the bellows chamber 72. This will permit the spring 79 to raise the carriage 75—76—77 from the position of Figure 1 to the position of Figure 2.

The switch 48—50—49, which was open in Figure 1, will now close as in Figure 2, because elevating the carriage carries the switch arm 80 with it, but the switch arm will be engaged by the stationary stud 82 and will therefore swing downwardly with relation to the carriage and close the circuit through the wires 43 and 51. Closure of the circuit energizes the control terminal 52, thereby energizing the relay coil 55 through the wire 53 and the signal bulb 57 through the wire 54. Lighting of the bulb indicates to the operator that a fuel tank has been emptied. The operator can at any time test the bulb 57 by pushing inwardly on a rod 56a to close the test switch 56.

Energization of the relay R causes its contacts 46 to close and thereby close the circuit of the solenoid 61, which will operate under the control of the toggle switch 63 to advance the ratchet wheel 69 in a step-by-step manner as already described.

The solenoid cutout switch 65 in the circuit of the solenoid 61 may at any time be opened, if it is desirable to discontinue automatic selector valve operation. Thereupon the selector valve may be operated manually at the control panel 31 by manipulating the handle 32, which handle may also be manually rotated clockwise any time desirable, even though the automatic selector valve operating mechanism is in operating condition by closure of the cutout switch 65.

Rotation of the ratchet wheel 69 will shift the L-shaped passageway of the selector valve 10 from the inlet 7 to the inlet 8, so that fuel will then be drawn from the tank 2. As soon as the pump 17 starts receiving fuel from the tank 2, pressure will again be built up in the pressure regulator PR and in the bellows chamber 72, thereby contracting the bellows from the position of Figure 2 to the position of Figure 3. In this operation the switch arm 80 is carried with the carriage 75—76—77 to a lowered but still closed position. Finally, when the L-shaped passageway 12 is in complete registry with the inlet boss 8, the cam lobe 81b will move from the position of Figure 3 to the position in Figure 1 assumed by the cam lobe 81a, thereby engaging the switch arm cam lobe 83 and opening the switch as in Figure 1. If it so happens that the fuel tank 2 is empty, then pressure will not be built up in the bellows chamber 72 of the switch S and the position of Figure 3 will not be assumed, but the cam lobe 81b will pass on and the cam lobe 81c will effect opening of the switch S, providing there is fuel in the fuel tank 3.

The baffle arrangement built into the pressure regulator effectively eliminates all trouble experienced with changes in altitude and temperature and with sudden changes in fuel pressure which cause surges through the pressure regulator PR without such surges being transmitted to the bellows 70.

I have illustrated and described my improvement in embodiments which I have found very satisfactory. I have not attempted to illustrate or describe certain adaptations or modifications which I contemplate, or the various uses and adjustments possible, as it is believed that the foregoing disclosure will enable those skilled in the art to which this invention appertains to embody or adapt my improvements as may be desired.

Having thus described my invention, I now claim and desire to secure by Letters Patent:

1. In a fuel pumping system, a fuel pump, a fuel consuming device, an electrically operated selector valve, a pressure responsive switch for controlling said electrically operated selector valve, a switch pressure regulator having an inlet and an outlet connected respectively with the exhaust of said fuel pump and the intake of said fuel consuming device, and having a valve seat between said inlet and said outlet, a valve plug for seating against said valve seat, adjustable spring means for normally retaining said valve plug seated on said valve seat against the pressure of fuel entering said inlet, an opening bypassing said valve plug to permit fuel and/or air to pass therethrough whereby fuel in excess of an amount for which said spring is set will lift said valve plug from said valve seat and permit increased flow of fuel from said inlet to said outlet without substantial increase of pressure in said valve body between said valve plug and said inlet, a connection from said switch pressure regulator between said seat and said inlet and extending to the pressure responsive means of said pressure responsive switch, said connection including a series of staggered baffle plates providing a tortuous path for fuel flow and restricting free flow of fuel therethrough.

2. A fuel system comprising a pump, a fuel consuming device, an electrically operated selector valve, a pressure responsive switch for controlling said electrically operated selector valve, a switch pressure regulator connected between the outlet of said fuel pump and the inlet of said fuel consuming device, and having a valve seat between said pump outlet and said fuel consuming device inlet, a valve plug for seating toward said pump outlet and against said valve seat, spring means for normally retaining said valve plug seated on said valve seat against the pressure of fuel from said pump outlet, a by-pass opening for said valve plug, a connection from said regulator between said pump outlet and said valve seat and extending to the pressure responsive means of said pressure responsive switch, said connection including baffle plates providing a tortuous path restricting free flow of fuel through said connection and a fuel trap for said connection.

3. A fuel system including a fuel pump, a fuel consuming device, an electrically operated selector valve, a pressure responsive switch for controlling said electrically operated selector valve, a fuel pressure connected between the outlet of said fuel pump and the inlet of said fuel consuming device, and having a valve seat between said pump outlet and said fuel consuming device inlet, a valve plug for seating toward said pump outlet and against said valve seat, spring means for normally retaining said valve plug seated on said valve seat against the pressure of fuel entering said regulator, a by-pass opening for said valve plug to permit a predetermined amount of fuel and/or air to by-pass said valve plug whereby fuel in excess of the amount possible of flow through said by-pass opening will lift said valve plug from said valve seat against the pressure of said spring means and permit increased flow of fuel from said pump outlet to said fuel consuming device inlet with substantially no increase of pressure in said regulator between said pump outlet and said valve seat, and a connection from said regulator between said pump outlet and said valve seat and extending to the pressure responsive means of said pressure responsive switch.

4. In a fuel system, a fuel pump, a fuel consuming device supplied with fuel from said fuel pump, a pressure responsive control switch, a switch pressure regulator having an inlet and an outlet connected respectively with the exhaust of said fuel pump and the intake of said fuel consuming device, said regulator having a valve seat between said inlet and said outlet, a valve plug normally seated on said valve seat, means to bias said valve plug to seated position against the pressure of fuel entering said inlet, an opening through said valve plug to permit some fuel and/or air to freely pass therethrough whereby fuel in excess of a certain amount builds up pressure within said valve body between said seat and said inlet, said valve plug being unseated by the pressure of fuel when the pressure increases to a point where it overcomes said biasing means, and a pressure connection between that portion of said regulator between said inlet and said valve seat and the pressure responsive means of said pressure responsive switch, said pressure connection including a tortuous path to restrict free flow of the fuel to and from said pressure responsive means.

5. In a fuel system having a fuel pump, a fuel consuming device, a pressure responsive controller, and a pressure regulator having an inlet and an exhaust connected respectively with the outlet of said fuel pump and the intake of said fuel consuming device, said pressure regulator having a valve seat between said inlet and said outlet, a valve plug for seating toward said outlet and against said valve seat, a by-pass opening for said valve plug to permit fuel to pass therethrough with an amount of fuel in excess of that which freely flows through said by-pass opening lifting said valve plug from said valve seat and permitting increased flow of fuel from said inlet to said outlet without increase of pressure in said regulator between said valve plug and said inlet, and a connection from said regulator between said valve plug and said inlet and extending to the pressure responsive means of said pressure responsive controller.

6. In a system of the class described, a switch pressure regulator, a pressure responsive switch, said regulator having an inlet and an outlet, a valve seat between said inlet and said outlet, a valve plug normally seated on said valve seat, means to bias said valve plug to seated position, a by-pass opening for said valve plug to permit a fluid and/or air within limits to freely pass through said valve body, and a pressure connection between that portion of said valve body between said inlet and said valve seat and the pressure responsive means of said pressure responsive switch, said pressure connection including a staggered baffle plate arrangement to restrict free flow of the fluid to and from said pressure responsive means.

7. In a system of the class described, a switch pressure regulator, a pressure responsive switch, said regulator having an inlet and an outlet, a valve seat between said inlet and said outlet, a valve plug normally seated on said valve seat, means to bias said valve plug to seated position, a by-pass opening for said valve plug to permit an amount of fluid to freely pass through said regulator whereby fluid in excess of such an amount builds up pressure within said regulator against said valve plug to unseat it when the pressure increases to a point where it overcomes said biasing means, and a pressure connection between that portion of said regulator between said inlet and said valve seat and the pressure responsive means of said pressure responsive switch.

8. In a system of the character disclosed, a pressure responsive device, a pressure regulator having an inlet and an outlet, a valve seat between said inlet and said outlet, a valve plug for coaction with said valve seat, said regulator having a head, an adjusting stem extending therethrough and rotatable relative thereto, an adjusting nut threaded on said adjusting stem, coacting slot and projection means to prevent rotation of said adjusting nut, an adjusting spring interposed between said valve plug and said adjusting nut, a lock nut exterior of said head and threaded on said adjusting stem, a connection from between the inlet and valve seat of said regulator to said pressure responsive device, said valve plug having an opening therethrough to permit free flow of an amount of fluid and/or air therethrough from said inlet to said outlet of said regulator whereby fluid in sufficient amounts to overcome the bias of said adjusting spring will lift said valve plug from said valve seat and thereby permit increased fuel flow through said regulator.

9. In a fuel system, a switch pressure regulator, a fuel pump, a fuel injector or the like, an electrically operated selector valve, a pressure responsive switch for controlling said electrically operated selector valve, a switch pressure regulator having an inlet and an outlet connected respectively with the exhaust of said fuel pump and with the inlet of said fuel injector, a valve seat between said inlet and said outlet, a valve plug for coaction with said valve seat, said regulator having a head provided with an inwardly extending, slotted tubular extension, an adjusting stem extending through said head and rotatable relative thereto, an adjusting nut threaded on said adjusting stem and having projections coacting with the slots of said tubular extension to prevent rotation of said adjusting nut, a stop ring for said nut on said extension, an adjusting spring interposed between said valve plug and said adjusting nut, a lock nut exterior of said head and threaded on said adjusting stem, a connection from between the inlet and valve seat of said regulator to the pressure responsive means of said pressure responsive switch, a by-pass opening for said valve plug to permit free flow of some fuel and/or air therethrough from said inlet to said outlet whereby air flow therethrough will not produce a substantial pressure in said connection to said pressure responsive device and fuel in sufficient amounts to overcome the bias of said adjusting spring will lift said valve plug from said valve seat and thereby permit increased fuel flow through said regulator without substantial increase of pressure in said connection.

10. A system of the kind disclosed comprising a pressure responsive device, a pressure regulator having an inlet, an outlet, a valve seat between said inlet and said outlet, a valve plug for coaction with said valve seat, an adjusting stem through a wall of said regulator, an adjusting nut on said adjusting stem, an adjusting spring interposed between said valve plug and said adjusting nut, and a connection from between the inlet and valve seat of said valve body to said pressure responsive device, said valve plug having an opening therethrough from said inlet to said outlet of said regulator.

11. In a fuel system, a fuel pump, a fuel consuming device, a selector valve, electrically operated means for controlling said selector valve, a pressure responsive switch for energizing said electrically operated means having an inlet and an outlet connected respectively with the exhaust of said fuel pump and the inlet to said fuel consuming device, a spring urged valve plug seated in said regulator against the flow of fuel therethrough, a by-pass opening for said valve plug to permit fuel and/or air to pass therethrough with normal fuel flow effecting unseating of said valve plug, a connection from that portion of said regulator between said inlet and said valve seat to the pressure responsive means of said pressure responsive switch, said connection including a bore, and a series of closely spaced discs arranged transversely of said bore, alternate discs of said series having openings adjacent opposite sides of said bore to provide a tortuous path and restriction for free flow of fuel therethrough to and from said pressure responsive means.

12. In a system of the class described, a fuel pump, a fuel consuming device, a pressure responsive controller, a pressure regulator having an inlet and an outlet connected respectively with the exhaust of said fuel pump and the intake of said fuel consuming device, a valve plug seated in said regulator against the flow of fuel therethrough, a spring biasing said valve plug to its seated position, a by-pass opening for said valve plug, and a connection from that portion of said regulator between said inlet and said valve seat to the pressure responsive means of a pressure responsive device.

13. In a fuel system, a selector valve, electrically operated means for controlling said selector valve, a pressure responsive switch for energizing said electrically operated means, a fuel pump, a fuel consuming device, a switch pressure regulator having an inlet and an outlet connected respectively with the exhaust of said fuel pump and the intake of said fuel consuming device, a spring urged valve plug seated against the flow of fuel through said regulator, a connection from that portion of said regulator between said inlet and said valve seat to the pressure responsive means of said pressure responsive switch, said connection including a bore, and a series of closely spaced discs arranged transversely of said bore, alternate discs of said series having openings adjacent opposite sides of said bore to provide a tortuous path for flow of fuel therethrough to and from said pressure responsive means.

14. In a fuel system, a selector valve, electrically operated means for controlling said selector valve, a pressure responsive switch for energizing said electrically operated means, a fuel pump, a fuel consuming device, a switch pressure regulator having an inlet and an outlet connected respectively with the exhaust of said fuel pump and the intake of said fuel consuming device, a spring urged regulator plug seated in said valve against the flow of fuel therethrough, a connection from between said inlet and said valve seat to the pressure responsive means of said pressure responsive switch, said connection including staggered baffle plates therein to effect restriction of free fuel flow and permit expansion and contraction of fuel in the connection without substantially varying the pressure relation between said regulator and said pressure responsive means.

DAVID SAMIRAN.